Nov. 11, 1969    J. E. FUZZELL ET AL    3,477,607
LOCKABLE SPOUT CLOSURE CAP
Filed Oct. 24, 1967    2 Sheets-Sheet 1
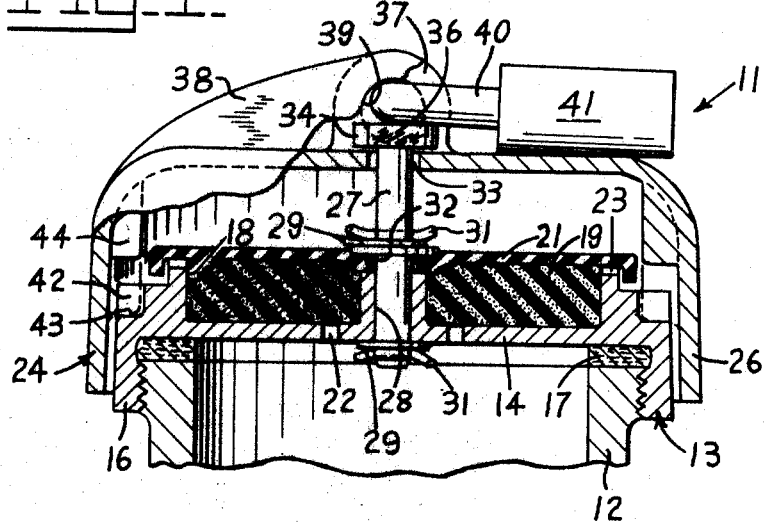
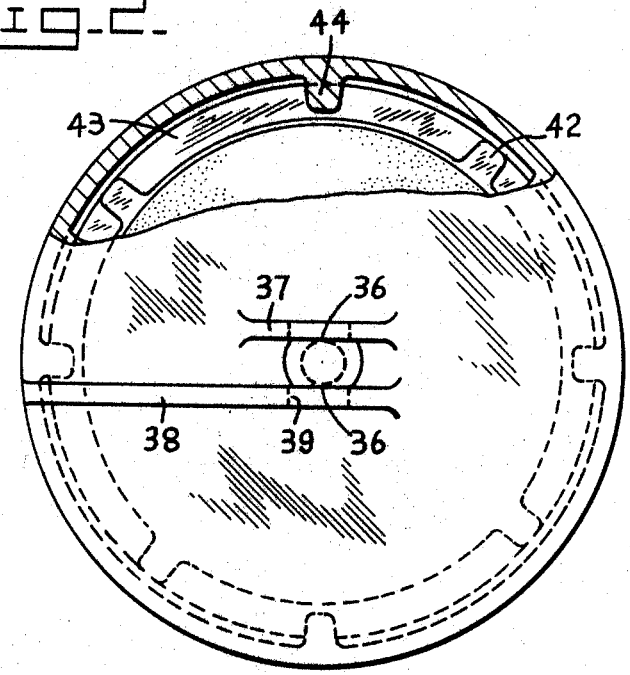
INVENTORS
JOE E. FUZZELL
JOHN C. THOMPSON
JOHN L. JOHNSON, JR
BY
ATTORNEYS

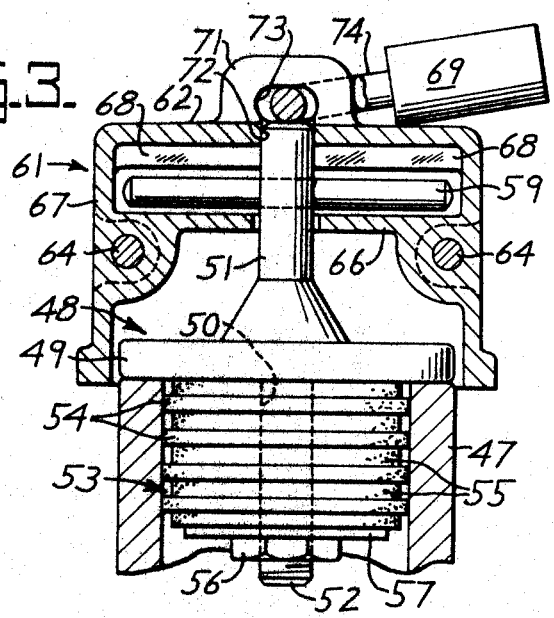
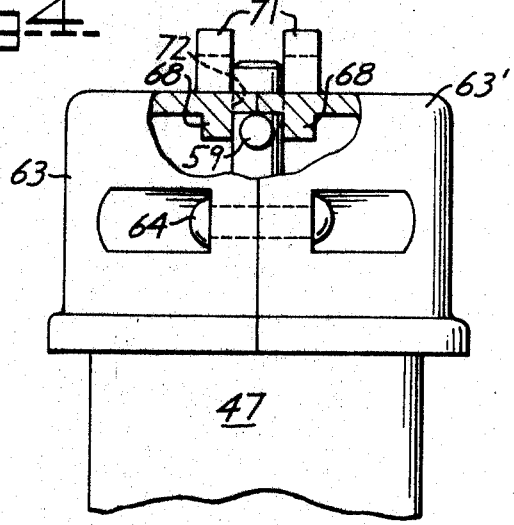

United States Patent Office 3,477,607
Patented Nov. 11, 1969

3,477,607
LOCKABLE SPOUT CLOSURE CAP
Joe E. Fuzzell, Peoria, John C. Thompson, Canton, and John L. Johnson, Jr., Dunlap, Ill., assignors to Caterpillar Tractor Co., Peoria, Ill., a corporation of California
Filed Oct. 24, 1967, Ser. No. 681,054
Int. Cl. B65d 41/04; B67d 5/32; E05b 65/52
U.S. Cl. 220—39        1 Claim

ABSTRACT OF THE DISCLOSURE

A closure for the spout of a fuel tank, hydraulic fluid reservoir or the like, has an inner cap for engaging the spout and an outer cap which prevents direct grasping of the inner cap. The outer cap may be moved towards the inner cap to engage projections which transmit turning motion to the inner cap and may also be locked at an outward position at which the projections are disengaged and no torque is transmitted to the inner cap by turning of the outer cap.

BACKGROUND OF THE INVENTION

The present invention relates to disengageable closure devices and more particularly to cap closures, for spouts, conduits and the like which are lockable to forestall unauthorized opening.

Many varieties of equipment having exposed spouts are operated or stored under conditions which make it desirable that the spout closures be resistant to unauthorized removal. Automobiles, trucks, tractors and motor driven construction vehicles for example variously have fuel tank caps, radiator caps and in some instances filler spout caps for hydraulic drive systems, which should preferably be tamper-proof. The theft of fuel and vandalism in the form of introducing foreign materials into the fluid conduits of such equipment is unfortunately a common occurrence. Substantial losses and delays are sustained from such causes in both industrial and private operation of such vehicles.

While a variety of lockable caps have been developed, certain factors have tended to limit the use of such safeguards to specialized situations. Most notably, the prior locking cap structures have been costly to manufacture with the result that the use of such caps as standard equipment on vehicles has been ruled out for economy reasons. In addition, the cap mechanisms heretofore employed have been difficult to engage and disengage.

Providing for ease of engagement and disengagement is complicated in that many spouts, including most threaded spouts, do not have any projections or asymmetries into which the cap can be locked in a positive manner. Consequently such caps are not designed to provide a strictly positive lock but instead have a double cap structure in which an inner cap, which may be threaded or have other engagement means, is covered by an outer cap. When the closure is engaged on the spout, the outer cover cap is rotatable relative to the inner cap so that someone trying to disengage the closure by turning the outer cover cap does not succeed in applying torque to the inner cap which remains held in place by friction. A lock, generally key operated, is provided with actuating means which couples the outer and inner caps so that an authorized person can apply torque to the inner cap by turning the outer cover.

While this construction accomplishes the intended result, it also prevents the operator from directly holding the inner cap and thereby tends to prevent him from sensing, through touch, the positional relationship between the inner cap and spout. This results in difficulty and delay in the operation of the closure, particularly during engagement of the cap. In the case of threaded caps, jamming and damage from cross threading are common. This is further aggravated by the nature of the coupling mechanism between the two caps which, in typical prior closures, applies force to the inner cap at a single point offset from the axis thereof. An unbalanced turning force applied in this manner inherently tends to twist the inner cap away from a strictly coaxial relationship to the threads or other engagement means on the spout and thereby results in jamming.

Still further difficulties have been encountered with closures of this general type, as heretofore constructed, in that the lock operated mechanism for coupling the inner and outer caps has tended to be prone to malfunction and to rapid wear, and difficulties have been experienced from the plugging of breathing vents in such caps.

SUMMARY OF THE INVENTION

This invention provides a simplified and less costly lockable cap closure of the general class discussed above while providing for a much improved manipulative control of the inner cap during engagement and disengagement. More specifically, the coupling between the inner and outer caps in the present invention is effected through a series of lug projections distributed in a circle around the adjacent faces of each member. The outer cap can be moved inward to interleave the two sets of lugs and thus provide a much more positive connection between the two caps for engagement and disengagement of the closure. The outer cap can also be moved outward from the inner cap to uncouple the two members and can be locked in the outer position so that an unauthorized person cannot apply any significant torque to the inner cap by turning the outer cap. The structure does not require a built-in key lock but may utilize an ordinary padlock.

Accordingly, it is an object of this invention to provide a simplified, more economically produced lockable closure cap for spouts and the like.

It is another object of this invention to provide for better manipulative control in a lockable closure cap device of the type having a threaded inner cap which must be operated through a disengageable outer cover cap.

It is still another object of this invention to reduce jamming and damage from cross threading in lockable closure caps.

It is still a further object of this invention to provide a more durable, reliable and more easily operated tamper-proof closure cap.

The invention together with further objects and advantages thereof will best be understood by reference to the following description of preferred embodiments taken in conjunction with the accompanying drawings.

BRIEF DESCRIPTION OF THE DRAWINGS

In the accompanying drawings:

FIGURE 1 is an axial section view of a closure cap embodying the invention for use on a threaded spout;

FIGURE 2 is a partially broken out view of the outer end of the closure cap of FIGURE 1;

FIGURE 3 is an axial section view of a closure cap embodying the invention which engages on an unthreaded spout, the cap being shown in the locked position; and FIGURE 4 is a side view of the embodiment of FIGURE 3 with the closure cap being shown in the unlock position and being shown with portions broken out to better illustrate the operation of the device.

DESCRIPTION OF PREFERRED EMBODIMENTS

Referring now to FIGURES 1 and 2 of the drawing, a closure assembly 11 is shown engaged with an externally threaded filler spout 12 of the type used, for example, at the fuel tank of a motor driven vehicle. To seal spout 12, assembly 11 is provided with an inner cap 13 having an end portion 14 formed integrally with an annular side section 16 which is internally threaded for engagement with the spout. An annular gasket 17 is disposed within the inner cap 13 and positioned to be contacted by the end of spout 12 when the cap is engaged thereon.

It is usually desirable in fluid systems to provide a breathing vent or port in a closure cap and for this purpose an annular well 18 is formed in the outer surface of end section 14 of the inner cap. A porous filter 19 is disposed in the well 18 and a plastic disc 21 fits thereagainst to retain the filter in place. Apertures 22 transpierce the top section 14 of the inner cap 13 to vent spout 12 through the filter 19. Radial notches 23 in the upper end of the rim of well 18 adjacent plastic disc 21 complete the breathing vent passage.

Considering now the means through which unauthorized persons are prevented from disengaging the inner cap 13 from spout 12, a larger outer cap 24 is situated over the inner cap and has a side section 26 which extends towards the spout 12 so that the exposed portions of the inner cap are enclosed.

Outer cap 24 is connected to the inner cap 13 by an axle pin 27 which extends through an axial bore 28 in the inner cap and disc 21. Axle 27 is retained by washers 29 and cotter-pins 31 at each end of the bore 28 and thus is rotatable therein. To prevent leakage along bore 28, an O-ring 32 is disposed around the axle pin 27 below the washer 29 at the outer end of the bore. Pin 27 projects outwardly from inner cap 13 through an opening 33 at the center of outer cap 24 and has an enlarged head 34 at the outer end of greater width than opening 33 so that the outer cap cannot be removed from the inner cap. The head 34, which has parallel sides 36, fits between a pair of parallel ear projections 37 and 38 formed on the outward surface of the outer cap 24. One such ear 37 is limited to the central area of the cap 24 while the other ear 38 is longer and extends to the side of the cap to facilitate gripping of the closure 11.

The above described construction provides for axial movement of the outer cap 24 relative to the inner cap 13 while preventing the outer cap from being wholly removed therefrom. As the outer cap 24 is rotatable relative to the inner cap 13 on axle pin 27, when at its outward position, turning of the outer cap at such time will not impart any significant torque to the inner cap.

Thus with the outer cap 24 in its outward position removal of the closure assembly 11 from spout 12 cannot be accomplished. In order to lock the outer cap 24 in the outward position for this purpose, a bore 39 extends through the ears 38 and 37 to receive the shackle 40 of a conventional padlock 41. The center line of bore 39 is situated slightly outward from the enlarged head 34 of axle pin 27 so that the shackle 40 of padlock 41 extends across the head 34 and prevents movement of outer cap 24 toward the inner cap 13.

Removal of the closure 11 from spout 12 requires that the outer cap 24 be moved toward the inner cap 13 and this can only be accomplished by an individual who possesses a key for removing the padlock 41 from the bore 39.

To engage the outer cap 24 with the inner cap 13 when padlock 41 has been removed, a series of angularly spaced lug projections 42 are provided on a shoulder 43 of the end portion 14 of the inner cap. A second set of lug projections 44 extend from the inner surface of the outer cap 24 in position to interleave with the lugs 42 when the outer cap is moved towards the inner cap. Thus with the outer cap 24 moved in towards the inner cap 13, the lugs 44, of which there are four in this example, engage the lugs 42 of the inner cap in order that the inner cap may be turned by means of the outer cap.

In operation, with the padlock 41 removed, the closure 11 is engaged upon spout 12 by grasping the outer cap 24 and twisting the closure while holding the outer cap inward to engage the inner cap 13. The firm connection between the inner and outer caps 13 and 24 provided by the interleaved lugs 42 and 44 results in excellent manipulative control of the closure during such engagement. An operator may feel the relationship between the inner cap 13 and the threaded spout 12 with an accuracy comparable to that obtainable when applying an ordinary unitary threaded cap to such a spout. Consequently the jamming and damage from cross threading which has heretofore been common in lockable closures of this general type is avoided.

After the inner cap 13 is fully engaged on the spout 12 the outer cap 24 is pulled outwardly and padlock 41 is inserted through bore 39 to hold the outer cap in such position. As discussed above, rotation of the outer cap while in this position cannot turn the inner cap 13 which remains fixed in engagement with the spout 12 by friction. Inasmuch as the outer cap 24 covers the inner cap 13 there is no practical way in which an unauthorized person can remove the closure 11 from the spout 12.

To open the closure 11 padlock 41 is removed from bore 39 allowing the outer cap 24 to be moved inwardly to engage the inner cap 13 by interleaving of the lugs 42 and 44. The outer cap 24 may then be rotated in a reverse direction to disengage the threads of the inner cap 13 from the spout 12. As in the case of engagement of the closure on the spout 12, the interleaved lugs 42 and 44 provide for excellent manipulative control of the inner cap 13 during removal of the closure 11.

As the locking of the closure 11 is effected by means of a removable conventional padlock 41, it is not necessary that a key be used to engage or disengage the closure when conditions do not require such a safeguard. The closure 11 may simply be engaged and disengaged as described above without making use of the padlock 41. This optional lockability is a very desirable feature in many situations, particularly where the closure is supplied as a standard fixture on vehicle spouts. However, it will be apparent that the closure may be provided with a permanently attached lock if desired.

While the closure has been herein described with reference to a structure which engages a threaded spout 12, it will be apparent that the invention is equally applicable to caps of the type which are rotated to engage a slotted lip at the end of the filler spout or which have still other means for attaching thereto. FIGURES 3 and 4, for example, illustrate another embodiment of the invention which engages on an unthreaded spout 47 by friction.

The inner cap in this embodiment is a closure assembly 48 of a type widely employed in the art for sealing unthreaded spouts such as the oil filler pipes of engines. More specifically, the inner cap assembly 48 is comprised of a cover disc 49 which seats against the end of spout 47 and which has a rotatable shaft 51 extending therethrough along the axis thereof. A shaft extension 52 extends into bore 50 of a resilient member 53 and projects axially from one end thereof. Resilient member 53 with a plurality of alternately spaced annular ribs 54 and grooves 55 is disposed coaxially on shaft 51 and extension 52. The ribs 54 have a diameter substantially conforming with the inner diameter of the spout. A nut 56 is engaged on the end of shaft extension 52 for the purpose of retaining and compressing member 53.

Rotation of the shaft 51 in a first angular direction tends to compress the rubber member 53 since friction forces between the rubber ribs and inner wall of spout 47 acts through a washer 57 to hold nut 56 against rotation which causes it to be drawn towards shaft 51. Opposite rotation of shaft 51 relieves the compressive force by a reverse action. Thus after emplacement of the inner cap assembly 48 at spout 47, appropriate rotation of the shaft 51 to compress the rubber member 53 causes the ribs to expand in a radial direction and thus to tightly grip the inner surface of the spout. Opposite rotation of shaft 51 causes the rubber ribs 54 to contract radially and thereby disengage the inner cap assembly 48 from the spout. To facilitate turning of the shaft 51, a handle rod 59 is transpierced therethrough with opposite ends of the rod extending radially therefrom.

The inner cap assembly 48 as described to this point is, as noted above, a known form of closure commonly employed at unthreaded spouts. It may be observed that the inner cap assembly 48 by itself is not lockable and is not readily combinable with known types of locking means. Considering now the adaptation of the present invention to this kind of closure device, an outer cap 61 is provided to cover the otherwise exposed portions of disc 49 and shaft 51 including handle rod 59, the outer cap being disposed coaxially with respect to shaft 51 and having an endwall 62 at the end remote from the spout 47. Although other methods of construction are possible, it is particularly convenient to form the outer cap 61 by joining two separate die cast parts 63 and 63' with the juncture therebetween lying in an axial plane of the cap assembly and with the two members being secured together by rivets 64 which extend through both parts along chords of the cap 61 as a whole.

Within the outer cap 61 an annular lip 66 extends inwardly from the sidewall 67 to shaft 51 between handle rod 59 and disc 49 of the inner cap. This permanently attaches the outer cap 61 to inner cap assembly 48 inasmuch as any attempt at withdrawal of the outer cap 61 is stopped by abutment of handle rod 59 against the lip 66. It may be noted that the above described formation of the outer cap 61 from two parts 63 and 63' provides for assembling of the closure to achieve this construction. Specifically, the rivets 64 are emplaced only after the two parts 63 and 63' have been juxtaposed around shaft 51 and handle 59.

Lip 66 is spaced from endwall 62 of the outer cap 61 a distance substantially greater than the radial thickness of handle rod 59. Thus, outer cap 61 is movable in an axial direction relative to the inner cap assembly 48 for a limited distance. To engage the outer cap 61 with the inner cap assembly 48 for the purpose of transmitting torque therebetween so that the closure may be engaged on spout 47 or removed therefrom, lug projections in the form of a pair of ribs 68 are provided along the inner surface of endwall 62 and extend parallel to a diameter thereof, the ribs being spaced apart whereby the handle rod 59 is received therebetwen when the outer cap is moved toward spout 47. Rotary motion of the outer cap at this position causes the ribs 68 to bear against the lug projections formed by the opposite ends of handle rod 59 and thereby turns shaft 51.

When the outer cap 61 is moved away from the spout 47, ribs 68 are shifted out of engagement with handle rod 59 and the outer cap may turn freely about shaft 51 without affecting the inner closure cap assembly 48. A padlock 69 may be used to hold the outer cap 61 at this outward position to prevent unauthorized persons from operating the closure.

To receive the padlock 69, a pair of spaced apart ears 71 project a short distance outwardly from the central area of endwall 62 each ear being at an opposite side of a center passage 72 therethrough. Each of the ears 71 has a slot 73 through which the shackle 74 of padlock 69 is inserted. The outer end of shaft 51 of the inner closure cap assembly 48 projects into center passage 72 and the several elements are proportioned to locate the end of the shaft 51 at the inner edge of ear slots 73 when the outer cap 61 is at its outermost position. At this position, the shackle 74 of the padlock prevents the outer cap 61 from being moved towards spout 47 to the extent necessary to engage ribs 68 with handle rod 59 and thus the closure cannot be operated until such time as the padlock 69 is removed.

As many variations are possible within the scope of the invention, it is not intended to limit the invention except as defined in the following claim.

What is claimed is:

1. A lockable closure cap for a spout comprising, in combination, an inner cap having means for engagement with said spout by rotation thereon, said inner cap having a first plurality of lug projections angularly spaced around the axis of rotation thereof, a rotatable outer cover cap disposed coaxially with respect to the inner cap and being movable relative thereto along said axis of rotation, said outer cap having a second plurality of lug projections spaced angularly around said axis of rotation for interleaving with said first plurality of lug projections when said outer cap is translated towards said inner cap whereby said inner cap may be rotated by turning said outer cap, said outer cap having an opening, means limiting movement of said outer cap away from said inner cap to an outward position at which said first and second plurality of lugs are disengaged including a pin projecting from said inner cap through said opening in said outer cap and having an enlarged head at the side of said outer cap remote from said inner cap, and means for locking said outer cap at said outward position thereof wherein a pair of ear projections are provided on said outer cap one on each side of said enlarged head of said pin, and wherein a bore extends through each of said ear projections to receive said means for locking said outer cap at said outward position thereof.

References Cited

UNITED STATES PATENTS

| 1,599,685 | 9/1926 | Spaeth | 70—164 X |
| 1,639,409 | 8/1927 | Johnson et al. | 222—382 X |
| 2,342,635 | 2/1944 | Barber et al. | 222—153 X |
| 2,533,395 | 12/1950 | Paine | 222—189 X |
| 2,950,030 | 8/1960 | McConnohie | 222—189 |
| 3,072,276 | 1/1963 | Nichols | 215—9 |
| 3,372,825 | 3/1968 | Lavano | 215—9 |
| 1,791,277 | 2/1931 | Lake | 70—164 X |
| 1,989,300 | 1/1935 | Webb | 70—164 X |

ROBERT B. REEVES, Primary Examiner

N. L. STACK, JR., Assistant Examiner

U.S. Cl. X.R.

70—165, 188; 220—44; 222—153, 189, 548